US007710975B2

(12) United States Patent
Commarford et al.

(10) Patent No.: US 7,710,975 B2
(45) Date of Patent: May 4, 2010

(54) SYNCHRONIZATION TECHNIQUE FOR EXCHANGING DATA WITH A MOBILE DEVICE THAT CONSERVES THE RESOURCES OF THE MOBILE DEVICE

(75) Inventors: Patrick M. Commarford, Delray Beach, FL (US); Chris J. Martinez, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 1027 days.

(21) Appl. No.: 11/383,043

(22) Filed: May 12, 2006

(65) Prior Publication Data

US 2007/0265025 A1 Nov. 15, 2007

(51) Int. Cl.
*H04L 12/56* (2006.01)
(52) U.S. Cl. ............... 370/395.21; 370/230; 455/418; 455/556.2
(58) Field of Classification Search .......... 455/418, 455/404.1, 466, 572, 574, 434, 556.2; 370/230, 370/395.21
See application file for complete search history.

(56) References Cited

U.S. PATENT DOCUMENTS

| | | | |
|---|---|---|---|
| 5,537,684 A * | 7/1996 | Cassidy et al. ............... | 455/512 |
| 5,686,901 A * | 11/1997 | Chen ........................ | 340/7.43 |
| 6,721,787 B1 | 4/2004 | Hiscock | |
| 6,959,436 B2 | 10/2005 | Peng | |
| 2002/0032722 A1 | 3/2002 | Baynes, Jr. et al. | |
| 2002/0065939 A1 | 5/2002 | Liu | |
| 2004/0054739 A1 | 3/2004 | Friend et al. | |
| 2004/0224675 A1 | 11/2004 | Puskoor et al. | |
| 2005/0044164 A1 | 2/2005 | O'Farrell et al. | |
| 2005/0044165 A1 | 2/2005 | O'Farrell et al. | |
| 2005/0044235 A1 | 2/2005 | Balahura et al. | |
| 2005/0057560 A1 | 3/2005 | Bibr et al. | |

OTHER PUBLICATIONS

Gallersdorfer, R., et al., "Improving Performance in Replicated Databases Through Relaxed Coherency", 21st Proc. Int'l. Conf. on Very Large Databases, Sep. 1995, pp. 445-456.
Fletcher, J.C., et al., "Process by Which Usage and Networking Characteristics Determine Dating of Pervasive Devices Updating of PvC Devices with Software Loads", Research Disclosure, Dec. 1998, vol. 41, No. 416, Art. 416134.
Subramanian, H.C., "A Scheduling Algorithm for Transferring Smaller Sized Files Faster Than Larger Sized Files for Multithreaded Data Transfer Applications", Research Disclosure, Dec. 2001, No. 452, Art. 94, p. 2087.
Miller, K., et al., "Synchronization of Mobile XML Databases by Utilizing Deferred Views", Proc. 2004 IEEE Conf. on Info. Reuse and Integration, Nov. 2004, pp. 186-191.

* cited by examiner

*Primary Examiner*—Temica M Beamer
(74) *Attorney, Agent, or Firm*—Patents on Demand, P.A.; Brian K. Buchheit

(57) ABSTRACT

A method for exchanging data with a mobile device that begins with the step of detecting a data exchange event. Next, at least one data exchange threshold is identified for the mobile device. An exchange urgency value is then determined and compared to the data exchange threshold. If the comparison is favorable, then the data exchange occurs immediately. Otherwise, the data exchange is placed in a delayed transmission queue, to be sent after a delay period.

20 Claims, 4 Drawing Sheets

SYNCHRONIZATION TECHNIQUE FOR EXCHANGING DATA WITH A MOBILE DEVICE THAT CONSERVES THE RESOURCES OF THE MOBILE DEVICE

BACKGROUND

1. Field of the Invention

The present invention relates to the field of mobile communications and, more particularly, to an intelligent and resource saving technique for exchanging data with a mobile device.

2. Description of the Related Art

Mobile devices are widely used by people to stay connected with family, friends, and occupational obligations. The connectivity provided by such devices allows businesses to overcome geographical distances, creating a distributed system of virtual offices. The common communication modes that mobile devices are used for include email, data transfer, text messaging, phone, two-way radio and instant messaging. Many of these mobile devices provide an integrated storage space, such as flash memory or a hard drive, that is synchronized with a storage space of a permanent computer. Within the synchronized data space, people can share and collaborate on a variety of files, such as calendar information and documents. Examples of data exchanges where storage spaces are synchronized can include a conveyance of patient records to/from a medical record system, an update of customer account information in response to a banking transaction or purchase through an e-retailer, and/or an inventory update between a barcode equipped scanning device and an inventory management system. A capability of synchronizing data spaces can allow a mobile device or remote computer system to function as an extension of an existing company network.

However, data exchanges made via this extensive network are not without cost. A data exchange between a mobile device and another remote computing device consumes device resources and sometimes incurs a monetary usage charge. For example, sending a text message from a mobile phone consumes battery power of the phone and connectivity providers often charge a user a fee for each text message sent.

Further, mobile devices often have a limited battery life that is consumed when a transceiver, such as a BLUETOOTH transceiver, a WIFI (802.11 family of protocols) transceiver, or a mobile telephone transceiver is active. Many mobile devices utilize a power-down or power-saving mode, which selectively activates transceivers on an as needed basis. Repeatedly powering these devices on and off when data exchanges occur, however, can have a significant detrimental effect on battery life. Similarly, bandwidth is usually limited when a mobile device is not within close proximity to a fixed computing device supplying connectivity. Appreciably, most mobile phones have multiple mutually exclusive modes, such as a data mode and a calling mode, so that when a large file is being downloaded/uploaded to or from a mobile phone and when bandwidth for these exchanges is relatively limited, the mobile phone is not available to receive incoming calls or to make outgoing calls for a potentially lengthy duration. Accordingly, data exchanges involving mobile devices can result in significant connectivity expenses and/or a significant lack of availability.

Conventional mobile devices have limited configurable options for exchanging data. One option is to immediately send and/or receive all messages whenever messages are available. This method can be extremely costly from a resource consumption perspective. Another conventional option is to connect the mobile device periodically to a remote data source on an iterative basis. Although this can conserve device resources, some data exchanges have a relatively high priority to the user and delays occurring between data exchanges can have negative effects.

For instance, it is desirable for a businessman to receive a meeting cancellation notice before the businessman is traveling to the meeting. If the notice is sent via email or text message near the time of the meeting, the businessman can become frustrated with any delay in receiving the cancellation notice.

Conventional mobile devices and exchange technologies lack mechanisms that permit a user, corporate system administrator, or message sender to balance message urgency against resource costs incurred though mobile device data exchanges.

SUMMARY OF THE INVENTION

The present invention adds an intelligent data exchange capability to mobile devices. According to one embodiment of the invention, one or more configurable thresholds, can be established for data exchanges involving a mobile device. New data exchange instances can be assigned an importance value, which can also be referred to as an urgency value. When the importance value for a data exchange is less than the threshold, a data exchange can be delayed. For example, the data exchange can be pooled for transmission with other data exchanges, which have been determined to be non-critical. When an importance value for a data exchange is greater than the threshold, the data exchange can be performed immediately. In one embodiment, any pooled exchanges can also be conveyed when any other data exchange is conducted. In another embodiment, a portion of a data exchange, such as an email message, can be immediately conveyed to a mobile device while a different portion of the data exchange, such as an email attachment, can be pooled for later transfer.

Additionally, different thresholds can be associated with different mobile device resources. These thresholds can be dynamically changed as the state of a mobile device is changed. For example, when a mobile device is directly connected to a power source, a threshold designed to conserve battery power can be dynamically and automatically lowered. In another example, when a mobile device is connected to a fixed device via a data transfer cable, such as when docked, a data exchange threshold associated with bandwidth can be automatically adjusted. It should be appreciated that thresholds and data exchange importance values can be configured by mobile device owners, by system administrators, by application designers, and/or by communicators initiating a data exchange directed to the mobile device.

The present invention can be implemented in accordance with numerous aspects consistent with material presented herein. For example, one aspect of the present invention can include a method for exchanging data with a mobile device that begins with the step of detecting a data exchange event. Next, at least one data exchange threshold can be identified for the mobile device. An exchange urgency value can then be determined and compared to the data exchange threshold. If the comparison is favorable, then the data exchange can occur immediately. Otherwise, the data exchange can be placed in a delayed transmission queue to be sent after a delay period. The delay period can be determined in part by a number of items that have accumulated within the queue and/or by a maximum delay period.

Another aspect of the present invention can include a system configured to conduct intelligent data exchanges with mobile devices. This system can include a mobile device, a second device that can communicate with the mobile device, and an exchange immediacy engine. The exchange immediacy engine can adjust an immediacy of a data exchange based upon an availability of device resources and an urgency level of the data exchange. The results of the exchange immediacy engine can determine whether the mobile device immediately performs the data exchange with the second device or whether the data exchange is delayed.

Yet another aspect of the present invention can include a software method for exchanging data with a mobile device. The software of the method can be stored upon a machine-readable medium which contains encoded instructions that cause a machine to perform a series of steps. The first of these steps can determine a resource level for a consumable resource of the mobile device before the device initiates an exchange of an electronic data item. Next, the electronic data item can be examined for its exchange urgency value. Another step can involve an automatic calculation of an exchange immediacy level for the data item that is based upon the determined resource level and the exchange urgency value of the preceding steps. The result of this step can determine whether the exchange is to occur approximately immediately or is to be delayed. The software method can also automatically perform the data exchange in accordance with the calculated exchange immediacy level.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
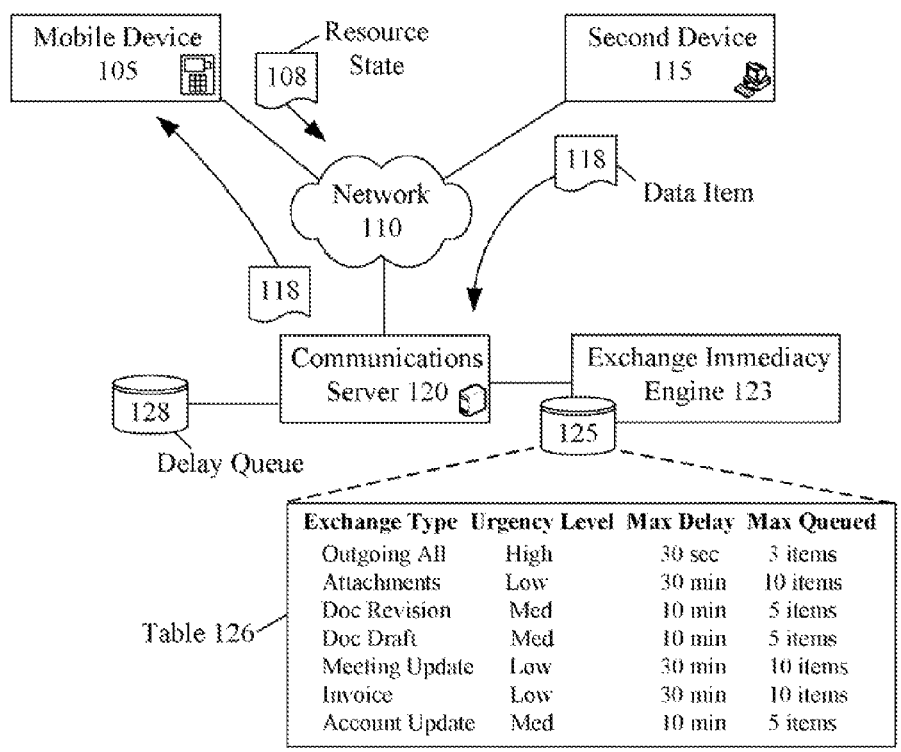
FIG. 1 is a schematic diagram illustrating two systems for synchronizing data exchanges with a mobile device in a manner that conserves resources in accordance with embodiments of the inventive arrangements disclosed herein.
Figure 1:
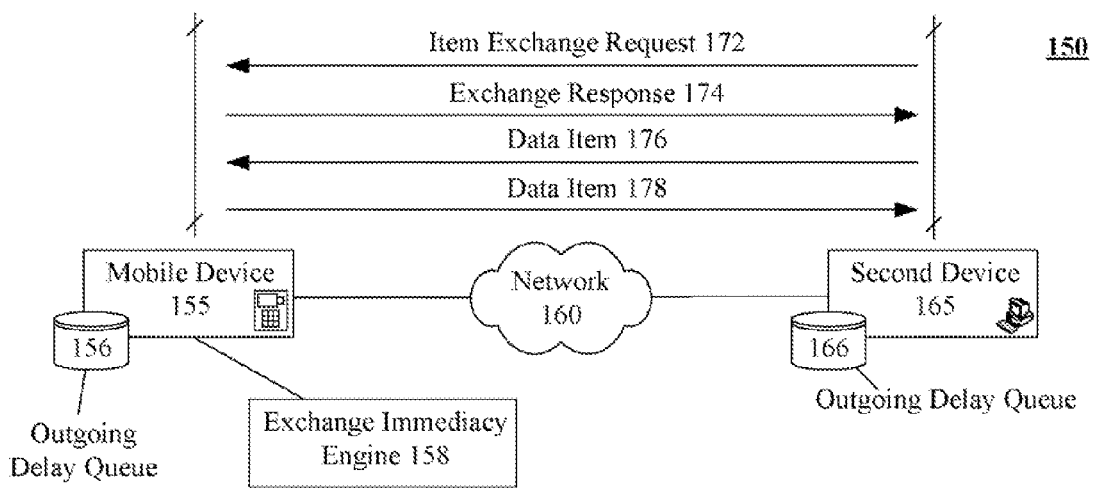

FIG. 1 is a schematic diagram illustrating a system 100 and a system 150 for synchronizing data exchanges with a mobile device in a manner that conserves resources in accordance with embodiments of the inventive arrangements disclosed herein. System 100 can include mobile device 105, second device 115, and communication server 120 communicatively linked through network 110.

Mobile device 105 can be any device that can exchange data item 118 with second device 115 via network 110. Mobile device 105 can be any of a variety of mobile devices including, but not limited to, a two-way radio, a personal data assistant (PDA), a mobile phone, a video game device, a media player, and the like.

Second device 115 can be a relatively stationary device or a second mobile device. In various contemplated embodiments, second device 115 can be implemented as any of a variety of electronic devices including, but not limited to, a personal computer, a server, a network data store, an embedded device, a two-way radio, a personal data assistant (PDA), a mobile phone, a media player, and the like.

Data item 118 can be any digital or electronic communication including, but not limited to an email, a digital file, a media stream, a video clip, a music file, a text message, and the like.

Communications server 120 can be any of a variety of network devices including, but not limited to, a network server, an email server, a file server, a web server, a private branch exchange (PBX), and the like. Contained within or connected to communications server 120 are delay queue 128 and exchange immediacy engine 123.

Exchange immediacy engine 123 can include a set of machine-readable instructions for determining the exchange urgency value for the exchange of data item 118 between mobile device 105 and second device 115. Exchange immediacy engine 123 can be implemented in a variety of manners including, but not limited to, a web service, a server application, a client application, an email server application plug-in component, and the like. Exchange immediacy engine 123 can access data store 125, which contains table 126.

Data table 126 can be a user/administrator configurable table of values, wherein each value can represent the urgency level of a designated type of data exchange. In one embodiment, data table 126 can include a number of rows, each row having values for a data exchange type, a data exchange urgency level, a maximum data exchange delay, and a minimum number of items permitted in a delay queue before an exchange is triggered.

As shown, data table 126 can set an urgency level of high, and a maximum delay time of thirty seconds for all outgoing messages. Additionally, a maximum number of items of a high urgency in the queue can be set for three items so that a transfer is initiated automatically when three items of high priority are queued irrespective of whether the maximum delay time has been reached for any of the queued items.

In one embodiment, the maximum queued items can also be based in part upon a memory size consumed by queued items instead of a number of items in a queue. Establishing a maximum queued memory space can be especially useful in embodiments where space within the delay queue 128 is limited. Additionally, a queuing algorithm based upon a combination of multiple delay factors such as maximum delay time, maximum queued records, and maximum queued memory space, can be used to determine when queued items are to be released from the delay queue 128.

Turning back to table 126, attachments, meeting updates, and invoices can have a low urgency level, a maximum delay of thirty minutes, and a maximum of ten queued items. Document revisions, document drafts, and account updates can each have medium urgency levels, maximum delays of ten minutes, and a maximum of live queued items. It should be noted that some exchange types can conditionally change their urgency level depending upon additional factors. For example, a meeting update can have a low urgency level when the meeting is more than a day away, a medium urgency level when the meeting is more than one hour away, and a high urgency when the meeting is less than one hour away. When a given exchange satisfies criteria of more than one exchange type in data table 126, the highest urgency level and lowest maximum delay can be utilized for the exchange. Thus, different exchange types of the same urgency level can have different type specific values for maximum time in queue and maximum items in queue.

In one embodiment, the maximum number of queued items can be based upon urgency level only and not upon the exchange type. Thus any combination of document revisions, document drafts, and account updates, each having a medium urgency, that total five items or more can release all items of medium urgency from the delay queue 128. Further, queued items of different urgency levels can be amalgamated using a conversion factor. For example, two items of medium urgency can be converted to one item of high urgency and two items of low urgency can be converted into one item of medium urgency by the exchange immediacy engine 123. Thus, four queued items of low urgency (equals two items of medium urgency) plus three items of medium urgency (for a converted total of five items of medium urgency) can trigger a release of all items from delay queue 128.

Interaction among the components of system 100 can be clarified through an example as follows. It should be appreciated that the following example is for illustrative purposes only and that the invention should not be construed as limited to the specific arrangements used within. In the example, second device 115 is attempting to transmit data item 118 to mobile device 105 via network 110. When this request for transfer reaches communications server 120, exchange immediacy engine 123 determines data item 118 should be transmitted to mobile device 105. In order to make this determination, exchange immediacy engine checks resource state 108 of mobile device 105 and data table 125.

Resource state 108 is a data transmission sent by mobile device 105 to communications server 120 for use in exchange immediacy engine 123. Resource state 108 can contain data values that correspond to the amount of consumable resources that are available for mobile device 105. For example, resource state 108 may contain a value of ten associated with power to signify that it is plugged into a wall power outlet.

The result of a calculation performed by exchange immediacy engine 123 determines whether data item 118 is immediately transmitted to mobile device 105 or whether data item 118 is stored in delay queue 128 for future transmission. In this example, the exchange urgency value calculated for data item 118 authorizes its immediate transmission to mobile device 105, thus, completing the data exchange.

System 150 is an alternate embodiment of the present invention and can include mobile device 155, network 160, second device 165, and exchange immediacy engine 158. Mobile device 155 can be linked to outgoing delay queue 156 and exchange immediacy engine 158. Second device 165 can be linked to outgoing delay queue 166. Mobile device 155 can be approximately equivalent to mobile device 105, second device 165 can be approximately equivalent to second device 115, and exchange immediacy engine 158 can be approximately equivalent to exchange immediacy engine 123, it should be appreciated that in this embodiment, exchange immediacy engine 158 can be implemented in a variety of manners including, but not limited to, a JAVA applet, a thin client, a client application, an email application plug-in component, and the like.

Interaction among the components of system 150 can be clarified through an example as follows. It should be appreciated that the following example is for illustrative purposes only and that the invention should not be construed as limited to the specific arrangements used within. In the example, second device 165 is attempting to exchange a data item with mobile device 155 via network 160. To begin this exchange, second device 165 transmits item exchange request 172 to mobile device 155. Upon receipt of this request, exchange immediacy engine 158 determines if mobile device 155 has enough resources to conduct and accept the data exchange. For example, exchange immediacy engine would check the amount of power and bandwidth available to mobile device 155 and use this information to calculate an exchange urgency value for the requested data exchange. This value is sent back to second device 165 in exchange response 174.

The contents of exchange response 174 determine whether second device 165 can immediately transmit data item 176 to mobile device 155 or whether the transmission is to be delayed. In this example, exchange response 174 authorizes the exchange of data item 176 from second device 165 to mobile device 105. When a transmission pathway is opened between mobile device 155 and second device 165, a previously queued data item 178, which was held in queue 156, can be conveyed to device 165 along the open transmission pathway.

In one contemplated derivation of system 150, a network data store (not shown) linked to network 160 can be used to temporarily store queued data items. Additionally, a network based synchronization engine (not shown) can be used to synchronize data exchanges between mobile device 155 and second device 165, when either of the devices 155 and 165 is temporarily disconnected from network 160 and is therefore unable to convey information to the other device. The synchronization engine can temporarily store relevant values, such as resource levels of mobile device 155, urgency levels for data items to be exchanges, and threshold values.

As used herein, presented data stores and queues, including stores 125, 128, 156, and 166, can be a physical or virtual storage space configured to store digital information. Data stores 125, 128, 156, and 166 can be physically implemented within any type of hardware including, but not limited to, a magnetic disk, an optical disk, a semiconductor memory, a digitally encoded plastic memory, a holographic memory, or any other recording medium. Each of the data stores 125, 128, 156, and 166 can be a stand-alone storage unit as well as a storage unit formed from a plurality of physical devices. Additionally, information can be stored within data store 125, 128, 156, and/or 166 in a variety of manners. For example, information can be stored within a database structure or can be stored within one or more files of a file storage system, where each file may or may not be indexed for information searching purposes. Further, data stores 125, 128, 156, and/or 166 can utilize one or more encryption mechanisms to protect stored information from unauthorized access.

Network 110 and network 160 can include any hardware, software and/or firmware necessary to convey data encoded within carrier waves. Data can be contained within analog or digital signals and conveyed through data or voice channels. Network 110 and network 160 can include local components and data pathways necessary for communications to be exchanged among computing device components and between integrated device components and peripheral devices. Network 110 and network 160 can also include network equipment, such as routers, data lines, hubs, and intermediary servers which together form a data network, such as the Internet. Network 110 and network 160 can also include circuit-based communication components and mobile communication components, such as telephony switches, modems, cellular communication towers, and the like. Network 110 and network 160 can include line based and/or wireless communication pathways.

Figure 2:
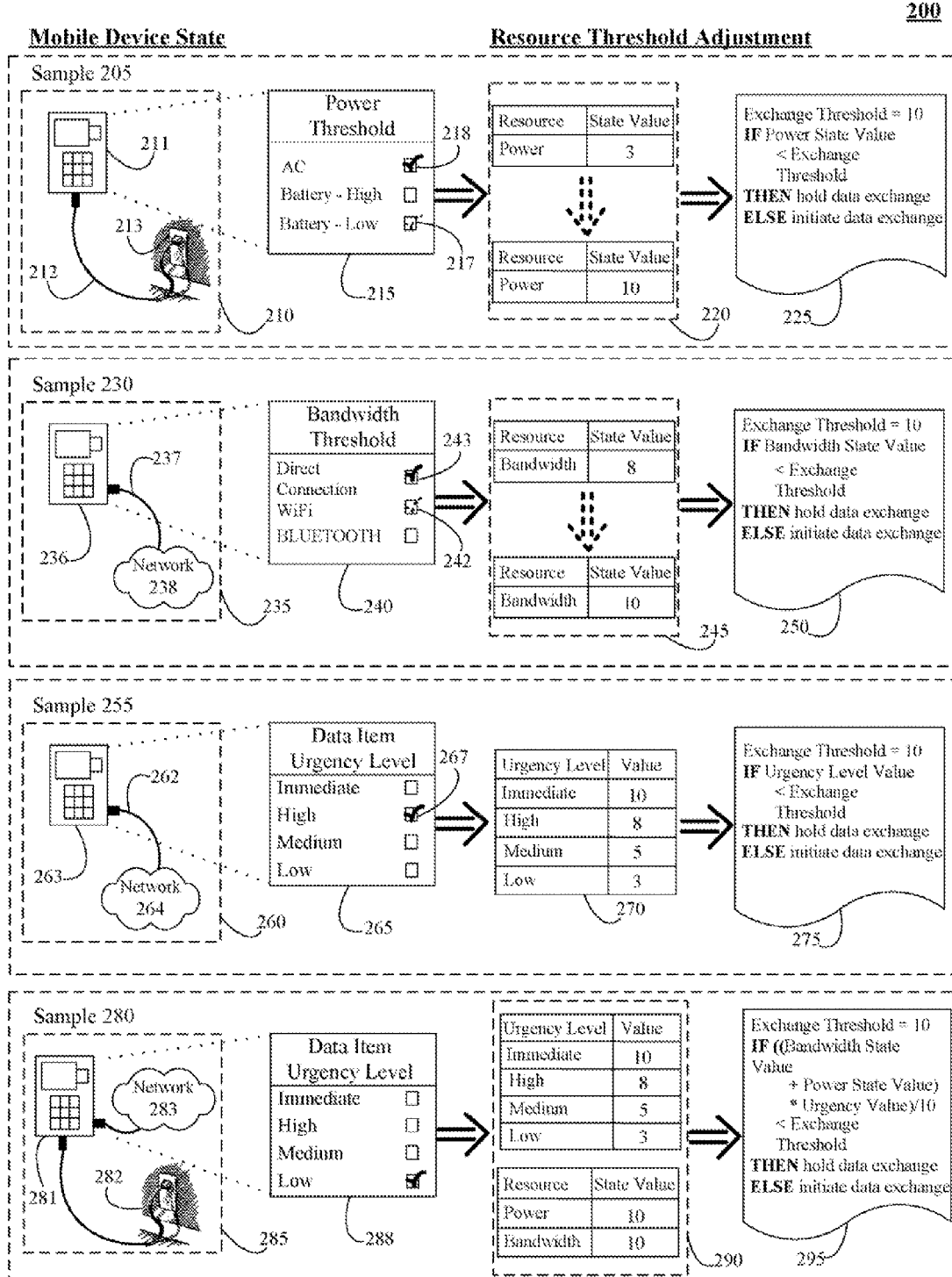
FIG. 2 illustrates a collection of sample resource threshold adjustments in accordance with an embodiment of the inventive arrangements disclosed herein.

FIG. 2 illustrates a collection 200 of sample resource threshold adjustments in accordance with an embodiment of the inventive arrangements disclosed herein. The samples of collection 200 can be performed in the context of system 100 or system 150. Collection 200 is not limited in this regard, however, and can be performed in the context of any system supporting mobile device data exchanges that conserve device resources.

Sample 205 includes mobile device state 210. In mobile device state 210, mobile device 211 is connected to power outlet 213 via power cord 212. The connection of mobile device 211 to power outlet 213 generates a change in power threshold 215, as indicated by the dotted lines.

Power threshold 215 represents the available power states for mobile device 211. Dotted check 217 illustrates that prior to connecting to power outlet 213 the power state of mobile device 211 was low battery. The power state change due to the connection to power outlet 213 is shown by solid check 218. Mobile device 211 is now running on AC power.

This change in power threshold 215 causes the change illustrated in state value 220. State value 220 represents the numerical priority values associated with various power states. In this example, state value 220 changes from a numeric value of 3, representing the low battery state, to a numeric value of 10, corresponding to the AC power state. State value 220 is then used in example code 225. Example code 225 is a pseudocode representation of a possible algorithm used by exchange immediacy engine 123 of system 100 or by engine 158 of system 150. In this example, the comparison of the power state value and the exchange threshold evaluates to FALSE, thus, initiating the data exchange.

Sample 230 includes mobile device state 235. In mobile device state 235, mobile device 236 is connected to network 238 via network cable 237. The connection of mobile device 236 to network 238 generates a change in bandwidth threshold 240, as indicated by the dotted lines.

Bandwidth threshold 240 represents the available bandwidth states for mobile device 236. Dotted check 242 illustrates that prior to connecting to network 238 the bandwidth state of mobile device 236 was WIFI or wireless fidelity. The bandwidth state change due to the connection to network 238 is shown by solid check 243. Mobile device 236 now has a direct cable connection for bandwidth.

This change in bandwidth threshold 240 causes the change illustrated in state value 245. State value 245 represents the numerical priority values associated with various bandwidth states. In this example, state value 245 changes from a numeric value of 8, representing the WIFI state, to a numeric value of 10, corresponding to the direct connection state. State value 245 is then used in example code 250. Example code 250 is a pseudocode representation of a possible algorithm used by exchange immediacy engine 123 of system 100 or by engine 158 of system 150. In this example, the comparison of the bandwidth state value and the exchange threshold evaluates to FALSE, thus, initiating the data exchange.

Sample 255 includes mobile device state 260. In mobile device state 260, mobile device 263 is connected to network 264 via network cable 262. In this example, a user of mobile device 263 adjusts urgency level 265 for a specified data item, as indicated by the dotted lines.

Urgency level 265 represents the available priority levels for a data exchange. Solid check 267 illustrates that a user has selected a level of high importance. The designation of solid check 267 in urgency level 265 corresponds to an entry in urgency table 270. Urgency table 270 contains the numerical priority values associated with various urgency levels. In this example, the value associated with the urgency level designated by solid check 267 is 8, representing a high level of exchange importance. This value from urgency table 270 is then used in example code 275. Example code 275 is a pseudocode representation of a possible algorithm used by exchange immediacy engine 123 of system 100 or by engine 158 of system 150. In this example, the comparison of the urgency level value and the exchange threshold evaluates to TRUE, thus, pooling the data item for a future exchange.

Sample 280 includes mobile device state 285. Mobile device state 285 is a composite of Samples 205, 230, and 255. Therefore, mobile device 281 is connected to network 283 and power outlet 282. Additionally, a user of mobile device 281 adjusts urgency level 288 for a specified data item, as indicated by the dotted lines.

Urgency level 288 illustrates that a user has selected a level of low importance for the data exchange. All numeric values associated with the power, bandwidth, and urgency level are shown in value table 290. In this example, the value associated with the direct connection to network 283 is 10; the value associated with the power connection to power outlet 282 is 10; the value associated with the low urgency level is 3.

These values are then used in example code 295. Example code 295 is a pseudocode representation of a possible algorithm used by exchange immediacy engine 123 of system 100 or by engine 158 of system 150. In this example, an equation is used to calculate the numeric equivalent for mobile device state 285 and urgency level 288. It should be appreciated that the equation used in this example is for illustrative purposes only and that the invention should not be construed as limited to the specific arrangements used within. Therefore, in this example, the comparison of the resultant exchange immediacy value and the exchange threshold evaluates to TRUE, thus, pooling the data item for a future exchange.

Figure 3:
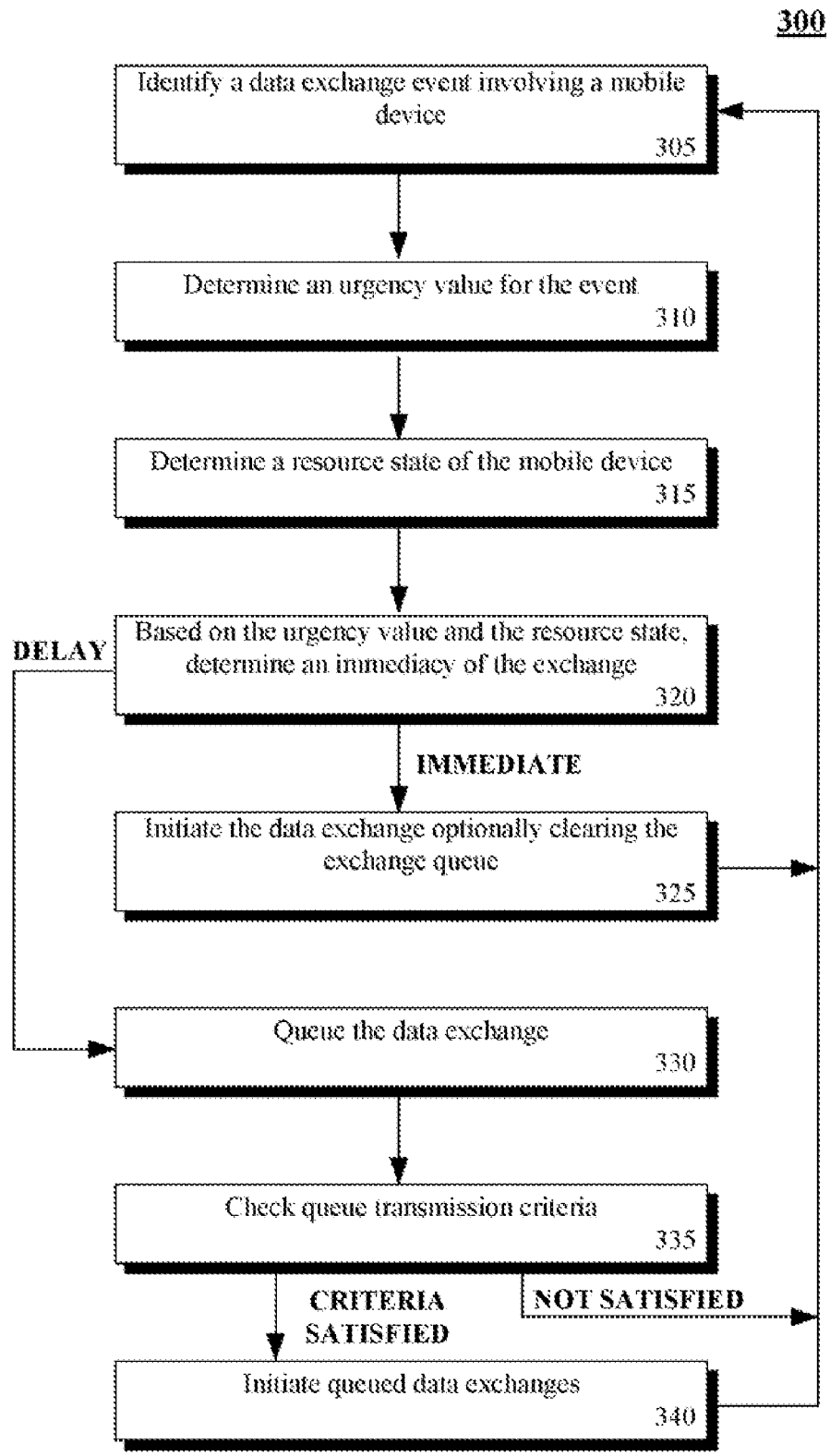
FIG. 3 is a flow chart of a method for synchronizing data exchanges with a mobile device in a manner that conserves resources in accordance with an embodiment of the inventive arrangements disclosed herein

FIG. 3 is a flow chart of a method 300 for synchronizing data exchanges with a mobile device in a manner that conserves resources in accordance with an embodiment of the inventive arrangements disclosed herein. Method 300 can be performed in the context of systems 100, 150, or in the context of any other system allowing the exchange of data in a manner that conserves mobile device resources.

Method 300 can begin in step 305, where the system identifies a data exchange event. Such an event can be initiated by a user of the mobile device, a communications server, or any device that communicates with the mobile device. In step 310, the system determines an urgency value for the identified event. An example of an urgency value can be a value contained in a configurable table within the system that is associated with various exchange types, as illustrated in exchange table 126 of system 100.

In step 315, a resource state of the mobile device is determined. In essence, this step determines the level of resources currently available to the mobile device. Based upon the data calculated in steps 310 and 315, the system then determines the immediacy of the data exchange in step 320.

If the data exchange is determined to occur immediately, step 325 is executed in which the data exchange is initiated immediately. It is also possible that other data items awaiting transmission are exchanged at this time as well. Upon completion of this step, the method returns to step 305 where it awaits the next data exchange event.

If the data exchange is to be delayed, then the data item is placed in a queue for future transmission as expressed in step 330. Items placed in the queue have criteria in which transmission can commence, lest the items would not leave the queue. Thus, when data items are in the queue, step 335 checks the transmission criteria. The transmission criteria can be based upon a maximum delay period, a maximum number of items of a specified urgency level in a queue, a maximum amount of memory space consumed by queued items, and other such factors taken alone or in combination. If the transmission criteria are satisfied, the method proceeds to step 340 in which the queued data exchanges are initiated. If the transmission criteria are not satisfied, then the method returns to step 305 where it awaits the next data exchange event.

Figure 4:
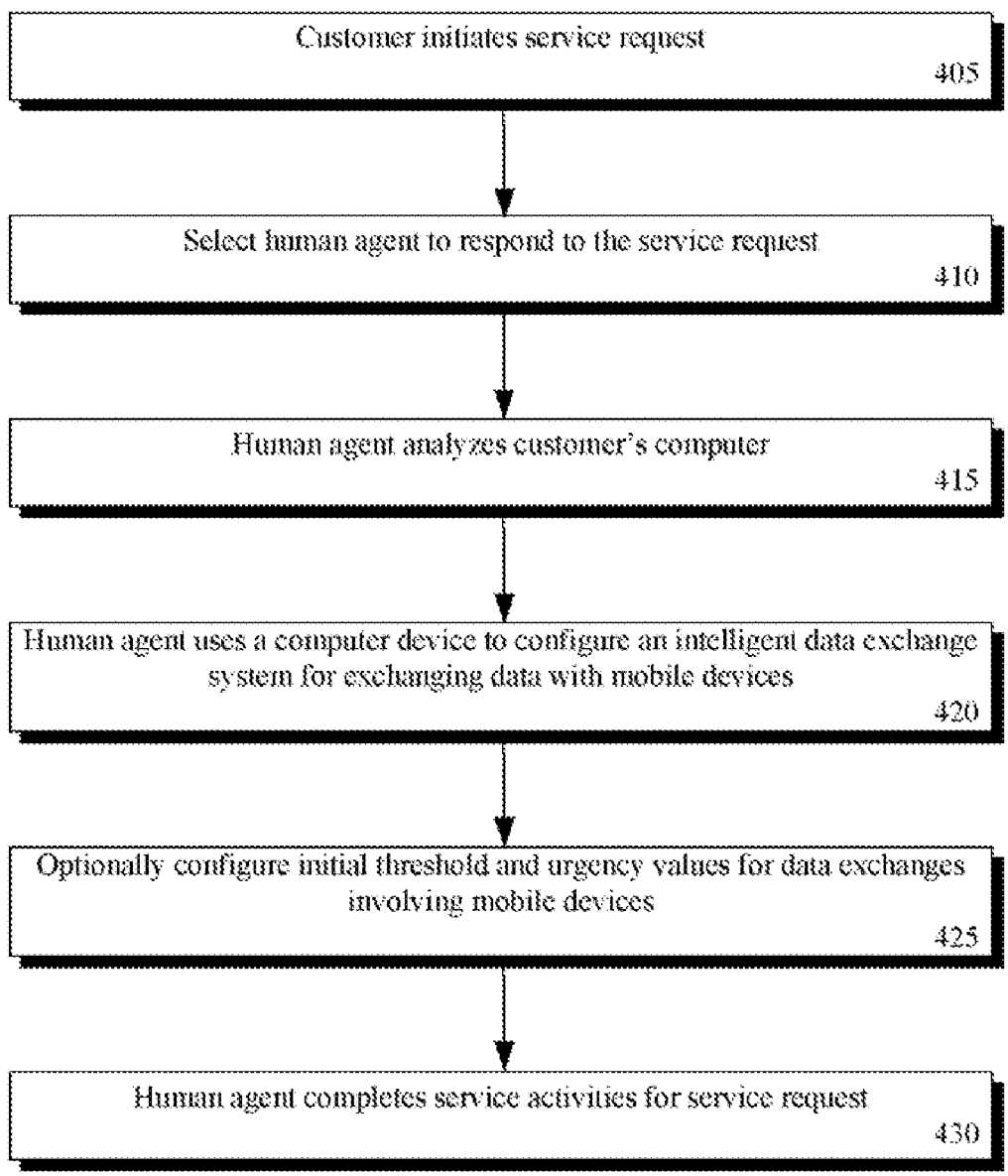
FIG. 4 is a flow chart of a method where a service agent can configure a system for handling data exchanges involving mobile devices in an intelligent manner in accordance with an embodiment of the inventive arrangements disclosed herein.

FIG. 4 is a flow chart of a method 400 where a service agent can configure a system for handling data exchanges involving mobile devices in an intelligent manner in accordance with an embodiment of the inventive arrangements disclosed herein. Method 400 can be preformed in the context of system 100, a system 150, and/or method 300.

Method 400 can begin in step 405, when a customer initiates a service request. The service request can be a request for a service agent to establish a new system for intelligently handling data exchanges. The service request can also be a request to troubleshoot a problem with an existing data exchange system or to enhance a data exchange system.

In step 410, a human agent can be selected to respond to the service request. In step 415, the human agent can analyze a customer's current system and can develop a solution. The solution can result in a system 100, a system 150, or any system where intelligent data exchanges are performed, such as a system that performs the steps of method 300.

In step 420, the human agent can configure the customer's system to exchange data with mobile devices in a manner that balances resource consumption against data exchange urgency. In step 425, the human agent can optionally configure initial thresholds and urgency values for the customer's system. The human agent can perform steps 420 and 425 and/or can configure a computing device of the customer in a manner that the customer or clients of the customer can perform steps 420 and 425 using the configured system in the future. For example, the service agent can load and configure software and hardware so that client devices will automatically exchange data with mobile devices in an intelligent fashion designed to conserve resources. In step 430, the human agent can complete the service activities.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for exchanging data with a mobile device comprising:
   detecting a data exchange event where a data item is to be exchanged between the mobile device and a second device;
   identifying at least one data exchange threshold for a mobile device;
   determining an exchange urgency value for the data exchange event based on a data exchange type of the data item;
   when the exchange urgency value favorably compares to the data exchange threshold, immediately initializing a data exchange associated with the data exchange event such that the data item is exchanged without being queued in a delayed transmission queue; and
   when the exchange urgency value unfavorably compares to the data exchange threshold, queuing the data item into the delayed transmission queue, wherein data items queued in the delayed transmission queue are exchanged after a delay period.

2. The method of claim 1, wherein exchange urgency value is configurable by a message sender.

3. The method of claim 1, wherein the at least one data exchange threshold is configurable by a mobile device user via a mobile device setting.

4. The method of claim 1, wherein a system administrator of a server that exchanges data with the mobile device configures at least one of the exchange urgency value and the data exchange threshold.

5. The method of claim 1, further comprising:
   ascertaining the data exchange type for the data exchange event; and
   querying a previously established table for the data exchange type to determine the exchange urgency value.

6. The method of claim 5, wherein the previously established table is a configurable table specified by at least one of a system administrator and an owner of the mobile device.

7. The method of claim 1, wherein the data exchange threshold is associated with a specific resource of the mobile device.

8. The method of claim 7, further comprising:
   detecting a change in a state of the mobile device that affects the device resource; and
   automatically adjusting the data exchange threshold of the device resource responsive to the detecting step.

9. The method of claim 8, wherein the specific mobile device resource is associated with a power source of the mobile device, whereby the threshold is lowered when the mobile device shifts from battery power to a direct power source and is raised when the mobile device shifts from a direct power source to battery power.

10. The method of claim 8, wherein the specific mobile device resource is associated with available bandwidth, whereby the threshold is lowered when bandwidth to the mobile device increases and is raised when bandwidth to the mobile device decreases.

11. The method of claim 1, wherein the at least one data exchange threshold comprises a plurality of data exchange thresholds, wherein each of the plurality of data exchange thresholds is associated with a different mobile device resource.

12. The method of claim 11, further comprising:
detecting a change in a state of the mobile device that affects one of the plurality of mobile device resources; and
automatically adjusting the data exchange threshold corresponding to the affected mobile device resource responsive to the detecting step.

13. The method of claim 1, wherein the data item is a data item selected from a group of data items consisting of a data store synchronization item, an email message, an instant message, and a text message.

14. The method of claim 1, wherein said steps of claim 1 are steps performed by at least one machine in accordance with at least one computer program having a plurality of code sections that are executable by the at least one machine.

15. A system for exchanging a data item comprising:
a mobile device;
a second device communicatively linked to the mobile device; and
an exchange immediacy engine configured to adjust an immediacy of a data exchange of the data item based upon a device resource of the mobile device and an urgency level of the data exchange based on a data exchange type of the data item, wherein the mobile device performs a data exchange of the data item between the mobile device and the second device based on the results of the exchange immediacy engine, wherein the results indicate that the data item is to be exchanged either without being queued in a delayed transmission queue or after being queued in the delayed transmission queue after a period of time.

16. The system of claim 15, further comprising:
a communications server configured to facilitate the exchange of data between the mobile device and the second device, wherein the exchange immediacy engine resides upon the communications server.

17. The system of claim 15, further comprising:
a table containing predetermined values used by the exchange immediacy engine to determine the immediacy of the data exchange.

18. The system of claim 17, wherein the predetermined values include data exchange types, each data exchange type having a corresponding value for the urgency level.

19. A software method for exchanging a data item between a mobile device and a second device, said software method being stored upon a machine-readable medium and specifying instructions causing a machine to perform the steps of:
determining a resource level of a consumable resource of a mobile device, wherein the mobile device is to be included in an exchange of the data item;
examining the data item to ascertain its exchange urgency value based on a data exchange type of the data item;
automatically calculating an exchange immediacy level based upon the determined resource level and the exchange urgency value, wherein at least two exchange immediacy levels situationally result from the calculating step, said at least two exchange immediacy levels comprising a level indicating that the exchange is to occur approximately immediately and a level indicating that the exchange is to be delayed; and
automatically performing the exchange in accordance with the calculated exchange immediacy level.

20. The method of claim 19, further comprising the steps of:
ascertaining the data exchange type for the exchange; and
querying a previously established table for the exchange type to determine the exchange urgency value, wherein values of the previously established tables are configurable by at least one of a user of the mobile device and an administrator of a communication server involved in the exchange.

\* \* \* \* \*